(12) United States Patent
Golgiri et al.

(10) Patent No.: US 11,760,340 B2
(45) Date of Patent: Sep. 19, 2023

(54) REMOTE PARK-ASSIST USER PEDESTRIAN LOCATION COACHING AND ENFORCEMENT

(71) Applicant: Ford Global Technologies, LLC, Dearborn, MI (US)

(72) Inventors: Hamid M. Golgiri, Livonia, MI (US); Erick Michael Lavoie, Van Buren Charter Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 17/102,930

(22) Filed: Nov. 24, 2020

(65) Prior Publication Data
US 2022/0161783 A1    May 26, 2022

(51) Int. Cl.
| | | |
|---|---|---|
| *B60W 30/06* | (2006.01) | |
| *H04W 4/40* | (2018.01) | |
| *H04W 4/02* | (2018.01) | |
| *G06V 20/58* | (2022.01) | |
| *G06V 20/56* | (2022.01) | |

(52) U.S. Cl.
CPC .......... *B60W 30/06* (2013.01); *G06V 20/586* (2022.01); *G06V 20/588* (2022.01); *H04W 4/025* (2013.01); *H04W 4/40* (2018.02); *B60W 2420/42* (2013.01); *B60W 2520/06* (2013.01); *B60W 2554/20* (2020.02); *B60W 2554/80* (2020.02)

(58) Field of Classification Search
CPC ............ B60W 30/06; B60W 2420/42; B60W 2520/06; B60W 2554/20; B60W 2554/80; G06V 20/586; G06V 20/588; H04W 4/025; H04W 4/40
See application file for complete search history.

(56) References Cited

U.S. PATENT DOCUMENTS

| | | | |
|---|---|---|---|
| 9,102,271 B2 | 8/2015 | Trombley et al. | |
| 9,610,943 B2 | 4/2017 | Lavoie et al. | |
| 10,266,023 B2 | 4/2019 | Mattern et al. | |
| 10,308,243 B2 | 6/2019 | Lavoie | |
| 2019/0092317 A1* | 3/2019 | Bonander | B62D 15/0285 |
| 2020/0070721 A1* | 3/2020 | Golgiri | B60Q 1/525 |
| 2020/0257317 A1* | 8/2020 | Musk | G05D 1/0044 |
| 2021/0086758 A1* | 3/2021 | Yamanaka | B62D 15/0285 |

* cited by examiner

*Primary Examiner* — Kenneth J Malkowski
(74) *Attorney, Agent, or Firm* — Frank Lollo; Price Heneveld LLP

(57) ABSTRACT

A vehicle control system includes at least one detection device configured to capture detection data and a controller. The controller identifies a parking space for a vehicle in an operating area based on the detection data and identifies a travel path of the vehicle from a current position to a target position aligning the vehicle with the parking space. In response to the travel path, the controller calculates a travel zone occupied by the vehicle traversing the travel path and determines at least one viewing zone proximate to the travel zone. The controller further determines a location of a user based on the detection data and controls a navigation routine of the vehicle along the travel path in response to the location of the user relative to the at least one viewing zone.

20 Claims, 7 Drawing Sheets

REMOTE PARK-ASSIST USER PEDESTRIAN LOCATION COACHING AND ENFORCEMENT

FIELD OF THE INVENTION

The present invention generally relates to a system for controlling an assisted parking operation and, more specifically, relates to a system for controlling a vehicle and assisting a user-pedestrian monitoring the operation of a vehicle.

BACKGROUND OF THE INVENTION

Advances in vehicle operation provide users with various improvements and novel features. While the operation of vehicles may have advanced significantly, in some cases, users may also benefit from instruction and guidance as to how to utilize the advanced features. Accordingly, the application provides for improvements related to the operation of one or more advanced maneuvering systems for vehicles.

SUMMARY OF THE INVENTION

According to one aspect of the disclosure, a vehicle control system for a vehicle is disclosed. The system comprises at least one detection device configured to capture detection data and a controller. The controller identifies a parking space for the vehicle in an operating area based on the detection data and identifies a travel path of the vehicle from a current position to a target position aligning the vehicle with the parking space. In response to the travel path, the controller calculates a travel zone occupied by the vehicle traversing the travel path and determines at least one viewing zone proximate to the travel zone. The controller further determines a location of a user based on the detection data and controls a navigation routine of the vehicle along the travel path in response to the location of the user relative to the at least one viewing zone.

Embodiments of the disclosure can include any one or a combination of the following features:
- the at least one detection device comprises a communication module configured to communicate with a remote device comprising a user interface, wherein the communication module identifies a position of the remote device and infers the location of the user;
- the communication module is further configured to communicate with a remote server via a wireless network, where the controller further accesses geographic information for the operating area;
- the controller further identifies a traffic zone and a pedestrian zone in response to the geographic information for the operating area;
- in response to the position of the remote device outside the viewing zone, generates an instruction to relocate the remote device in the viewing zone, wherein the instruction provides at least one of a direction and a distance to relocate the remote device in the viewing zone;
- the controller further instructs the remote device to demonstrate a simulated scene demonstrating the travel zone of the vehicle and the viewing zone;
- the location of the remote device is further demonstrated in the simulated scene;
- in response to the location of the user outside the viewing zone, the controller further controls the vehicle to suspend the navigation routine of the vehicle along the travel path;
- the at least one detection device comprises at least one of a camera and a proximity detection device;
- the controller further detects at least one obstruction proximate to the travel path via the detection data and adjusts a boundary of the at least one viewing zone corresponding to the location of the obstruction;
- the at least one obstruction comprises a parked vehicle located proximate to the parking space;
- the controller further determines viewing locations for the at least one viewing zone in response to a traffic zone and a pedestrian zone identified in the operating area;
- the controller further determines an egress path from the at least one viewing zone, and adjusts the at least one viewing zone, such that the egress path is accessible with the vehicle located in the parking space; and/or
- a vehicle maneuvering system that controls a velocity and a steering angle of the vehicle along the travel path in response to instructions received from the controller.

According to another aspect of the disclosure, a method for enforcing a viewing zone for monitoring a semi-automated vehicle operation is disclosed. The method comprises identifying a parking space for the vehicle in an operating area via the detection data and identifying a travel path of the vehicle from a current position to a target position aligning the vehicle with the parking space. The travel path includes a travel zone of the vehicle extending from a current position to the target position. In response to the travel path, the method calculates a travel zone occupied by the vehicle traversing the travel path and determines a perimeter of the at least one viewing zone based on the travel zone. The method further includes controlling a navigation routine of the vehicle along the travel path in response to a location of a user relative to the perimeter of the at least one viewing zone.

Embodiments of the disclosure can include any one or a combination of the following features:
- detecting the location of the user comprises detecting the location based on a position of a remote device identified via a communication module;
- in response to the position of the remote device outside the viewing zone, generating an instruction to relocate the remote device in the viewing zone;
- determining viewing locations for the at least one viewing zone in response to a traffic zone and a pedestrian zone identified in the operating area; and/or
- determining an egress path from the at least one viewing zone, and adjusting the at least one viewing zone, such that the egress path is accessible with the vehicle located in the parking space.

According to yet another aspect of the disclosure, a vehicle control system is disclosed. The system comprises at least one detection device configured to capture detection data and a controller. The at least one detection device is configured to identify a position of a remote device relative to a vehicle. The controller identifies a parking space for the vehicle in an operating area via the detection data and identifies a travel path of the vehicle from a current position to a target position aligning the vehicle with the parking space. In response to the travel path, the controller calculates a travel zone occupied by the vehicle traversing the travel path and identifies a pedestrian zone in response to geographic information for the operating area. The controller further determines at least one viewing zone proximate to the travel zone wherein the at least one viewing zone is positioned in the pedestrian zone. The controller further determines the position of the remote device and infers a location of a user based on the position of the remote device.

The controller controls a navigation routine of the vehicle along the travel path in response to the location of a user relative to the at least one viewing zone.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
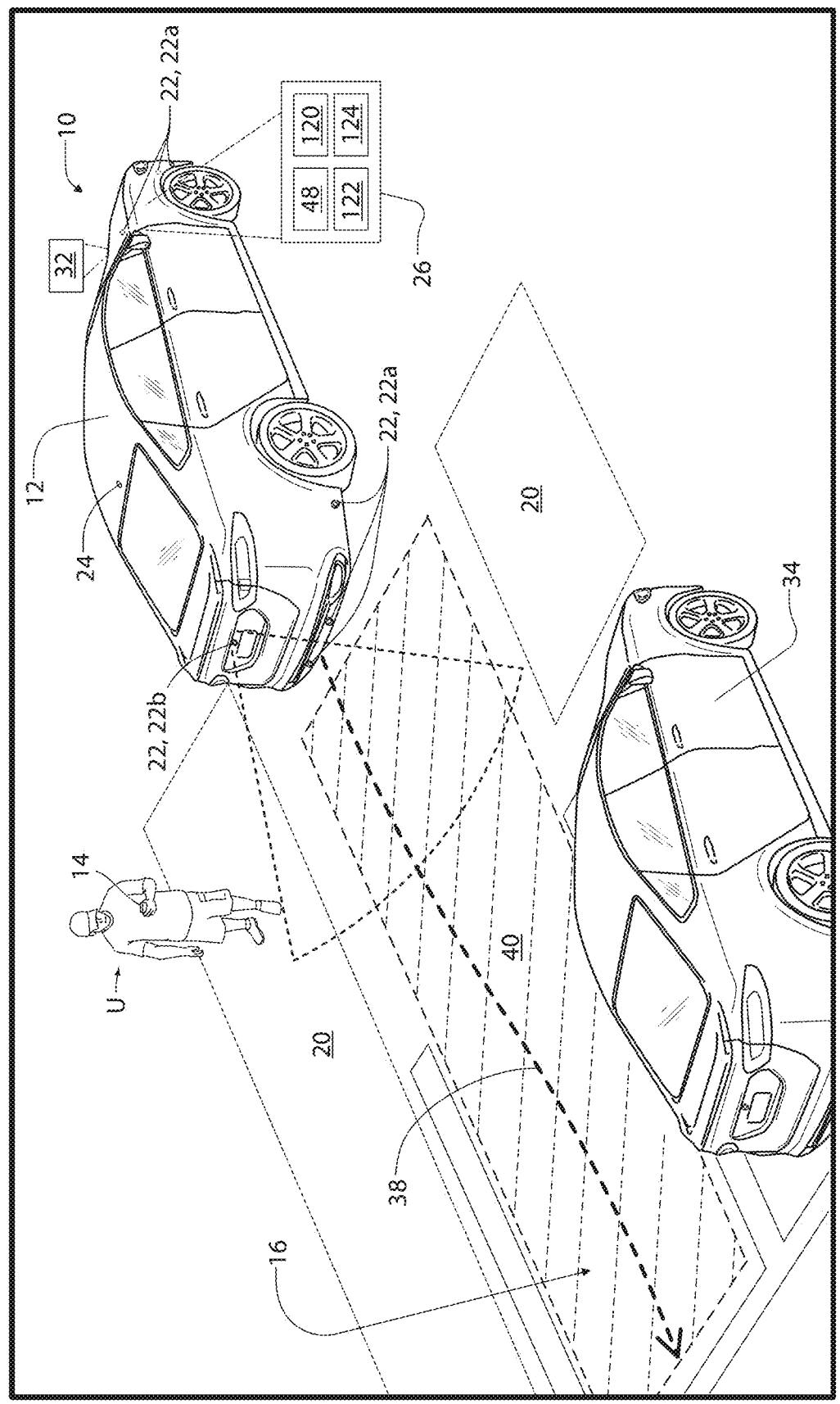
FIG. 1 is a perspective view of a vehicle demonstrating an assisted parking routine.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring generally to FIG. 1, a remote parking system 10 is shown incorporated into a vehicle 12. The remote parking system 10 may facilitate a vehicle operator or user U to exit the vehicle 12 before the remote parking system 10 autonomously parks the vehicle 12. In operation, the user U may activate the remote parking system 10 using a button on a key and/or an interface on a remote device 14 (e.g., a smart phone, a smart watch, a tablet, etc.). In this way, a vehicle 12 may be parked without requiring guidance of a conventional passenger-operator. In some cases, the remote parking system 10 may control the vehicle 12 to park in a parking space 16 in which the doors of the vehicle 12 may not have sufficient clearance to open. While the remote parking systems 10 may provide a variety of benefits, the system still may benefit from pedestrian-user observation and monitoring. Accordingly, the disclosure provides for an interactive routine that may instruct and/or enforce a position of the user U within a viewing zone 20. In this way, the disclosure provides for a guidance routine to position a user U for optimized viewing as well as ensuring that the user U is positioned in the viewing zone 20.

Specific examples of the operation of remote parking system 10 and the guidance routine of the user U are discussed in reference to FIGS. 3-8. To support the detailed operation of the system 10, the system is first generally introduced in reference to FIGS. 1 and 2. As described herein, the remote parking system 10 is configured to control the motive functions of the vehicle 12 to park without a driver occupying the vehicle 12. In various examples, the vehicle 12 may be a standard gasoline-powered vehicle, a hybrid vehicle, an electric vehicle, a fuel-cell vehicle, and/or any other type of vehicle. The vehicle 12 includes various drive components, such as a powertrain with an engine, a transmission, a suspension, a driveshaft, and/or wheels, etc. As provided by the exemplary implementations, the vehicle 12 may be semi-autonomous or autonomous. A semi-autonomous vehicle is a vehicle that autonomously controls some routine motive functions (e.g., assisted parking, remote assisted parking, adaptive cruise control, etc.) while the driver controls the vehicle. An autonomous vehicle is a vehicle that autonomously controls the motive functions of the vehicle without direct user control or intervention. As depicted in FIG. 1, the vehicle 12 includes a plurality of detection sensors 22, a wireless communication circuit 24, an electronic control unit (ECU) 26, the remote parking system 10, and a communication platform 32.

The range detection sensors 22a or detection devices sense objects or obstructions, such as a parked vehicle 34, and characterize spaces in the vicinity of the vehicle 12, such as the parking space 16. The detection sensors 22 may include ultrasonic sensors, cameras, infrared sensors, RADAR, and/or LiDAR, etc. In the illustrated example, a first group of the range detection sensors 22a are embedded in the bumper of the vehicle 12 to detect the parked vehicles 34 and characterize the parking space 16 for the remote parking system 10. Additionally, a second group of the detection sensors may be positioned in other locations (e.g., a body panel, deck lid, etc.) and may correspond to video or image sensors 22b to further to facilitate the detection of the parked vehicles 34 and characterization of parking spaces 16. In the illustrated example, the detection sensors 22 determine both an available clearance (width, length, etc.) and an occupancy of the parking spaces 16 to initiate an assisted parking routine as discussed herein.

Though generally discussed in reference to the vehicle 12, the detection sensor(s) 22 may include one or more devices in connection with or carried by the user U. For example, the detection sensor 22 may correspond to a range detection sensor 22a or image sensor 22b incorporated in the remote device 14. For example, the system 10 may be configured to communicate one or more instructions to the user U via the remote device 14 instructing the user to aim a field of view of a camera of the remote device 14 toward the vehicle 12. In this way, the system 10 may be configured to monitor the image data captured by the remote device 14 to identify the location or proximity of the user U relative to the vehicle 12 and the travel path 38. Based on the location or proximity of the user U, the system 10 may control the operation of the vehicle 12 in response to the position of the user U relative to the one or more viewing zones 20. Further details describing assisted parking operations and related vehicle operation is described in U.S. Pat. Nos. 10,308,243 B2 and 9,610,943 B2, the disclosures of which are incorporated herein in their entirety.

The wireless communication circuit 24 connects to the remote device 14 (e.g., a smart phone, a smart watch, a tablet computer, etc.) of the operator of the vehicle 12. In some examples, the wireless communication circuit 24 is configured in accordance with Bluetooth® Low Energy (BLE). Alternatively, in some examples, the wireless communication circuit 24 may operate in accordance with other local area or personal area network standards, such as Bluetooth®, IEEE 802.11 or IEEE 802.15.4, etc. When connected to the remote device 14, the wireless communication circuit 24 facilitates communication between the user U and the system 10 (e.g., activating the remote parking system, etc.). Additionally, the remote parking system 10 may communicate instructions identifying the viewing zone 20, the location of the parking space 16 targeted for the parking routine, a travel path 38 of the vehicle 12, and a travel zone 40 occupied by the vehicle 12 as calculated traversing the travel path 38.

In various embodiments, the system 10 may be configured to detect the location of the user U based on the range detection sensors 22a and/or image sensors 22b. Additionally, the system 10 may be operable to detect a location of the remote device 14 to position the user U and/or tether the user U within a predetermined range of the vehicle 12 in order to sustain or as a condition to activating the remote parking routine. For example, the wireless communication circuit 24 may detect the location of the remote device 14 based on time of flight detection as well as an angle of arrival or angle of departure directional signal determination based on RSS (Received Signal Strength), AOA (Angle of Arrival), TOA (Time of Arrival), and TDOA (Time Difference of Arrival), which may be supported by one or more wireless protocols (e.g., Bluetooth® Low Energy (BLE), Ultra-Wideband, etc.). Based on these methods, the location of the remote device 14 and the inferred location of the user U may be identified within a range of less than 20 centimeters.

The ECU 26 monitors and controls various subsystems of the vehicle 12. The ECU 26 communicates and exchanges information via a vehicle data bus 46. Additionally, the ECU 26 may communicate properties (such as status of the ECU 26, sensor readings, control states of the vehicle 12, error and diagnostic codes, etc.) to and receive instructions from other devices (e.g., the remote parking system 10, etc.) Though discussed in reference to a single electronic control unit, the ECU 26 may typically be implemented with multiple control units in communication via the data bus 46 and distributed throughout the vehicle 12 to monitor and control their corresponding vehicle systems. Each ECU 26 may correspond to one or more discrete sets of electronics that include their own circuit(s) (such as integrated circuits, microprocessors, memory, storage, etc.) and firmware, sensors, actuators, and/or mounting hardware. In the illustrated example, the ECU 26 includes a steering control unit 48, a brake control unit 50, a throttle control unit 52, and a transmission control unit 54. The steering control unit 48 includes actuators to control the steering (e.g., the angle of the wheels) of the vehicle 12 without driver input. The brake control unit 50 includes actuators to operate the brakes of the vehicle 12 without driver input. Additionally, the throttle control unit 52 is capable of adjusting the throttle of the vehicle 12 without driver input. The transmission control unit 54 facilitates changing the transmission setting of the vehicle 12 without driver input.

The communication platform 32 includes wired or wireless network interfaces to enable communication with external networks and devices. The communication platform 32 also includes hardware (e.g., processors, memory, storage, antenna, etc.) and software to control the wired or wireless network interfaces. The communication platform 32 may include controllers for Bluetooth® and/or other standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), and Wireless Gigabit (IEEE 802.11ad), etc.). The communication platform 32 may also include a global positioning system (GPS) receiver. Further, the external network(s) may be a public network, such as the Internet; a private network, such as an intranet; or combinations thereof, and may utilize a variety of networking protocols now available or later developed including, but not limited to, TCP/IP-based networking protocols.

In some examples, the remote parking system 10 determines a location of the detected parking space 16 in relation to traffic, structures, walkways, and various other local objects or obstructions that may be encountered by the vehicle 12 and the user U. For example, in response to identifying the parking space 16, the system 10 may connect, via the communication platform 32, to a server on an external network (e.g., the Internet) to determine environmental data, such as the surroundings and local environment surrounding the parking space 16. For example, a navigation data provider (e.g., Google®, MapQuest®, Waze®, etc.) may supply data on whether the parking space is located adjacent to a traffic zone, a pedestrian walkway, additional parking space, structures and various natural and/or man-made obstructions. In this way, the system 10 may identify the viewing zone(s) 20 away from obstructions and traffic paths or zones in relation to the travel path 38 of the vehicle 12. Additionally, in some cases, the system 10 may identify an egress path from the viewing zone 20 away from the vehicle 12, traffic, parked vehicles 34, and other obstructions, such that user U has a travel path away from the vehicle 12 once located in the parking space 16. Detailed examples of such operations are further discussed in reference to FIGS. 3-7.

Figure 2:
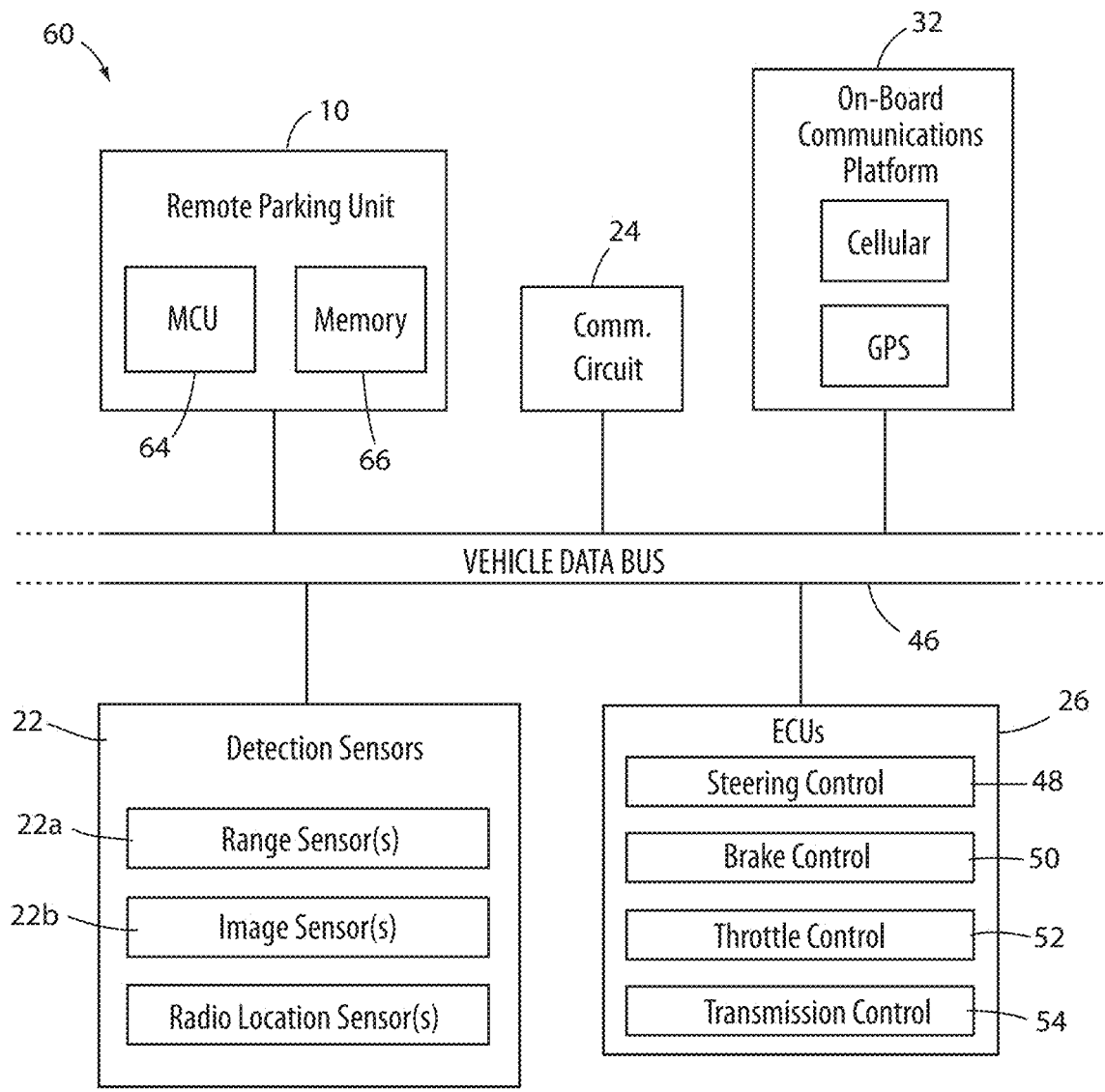
FIG. 2 is a block diagram demonstrating a control system of a vehicle configured to control an assisted parking operation.

Still referring to FIGS. 1 and 2, a block diagram is shown demonstrating various electronic components 60 of the vehicle 12 in communication with the remote parking system 10. In the illustrated example, the electronic components 60 include the remote parking system 10, the communication platform 32, the detection sensors 22, the wireless communication circuit 24, the ECU 26, and the vehicle data bus 46. In the example shown, the remote parking system 10 includes a processor or controller 64, and memory 66. The processor or controller 64 may be any suitable processing device or set of processing devices such as, but not limited to, a microprocessor, a microcontrollerbased platform, a suitable integrated circuit, one or more field programmable gate arrays (FPGAs), and/or one or more application-specific integrated circuits (ASICs). The memory 66 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 66 includes multiple kinds of memory, particularly volatile memory and non-volatile memory. In the exemplary implementation, the memory 66 is computer readable media on which one or more sets of instructions, such as the software for operating the methods of the present disclosure, can be embedded. The instructions may embody one or more of the methods or logic as described herein. In a particular embodiment, the instructions may reside completely, or at least partially, within any one or more of the memory 66, the computer readable medium, and/or within the processor 64 during execution of the instructions.

The vehicle data bus 46 communicatively couples the remote parking system 10, the communication platform 32, the sensors 22, the wireless communication circuit 24, and the ECU 26. In some examples, the vehicle data bus 46 includes one or more data buses. The vehicle data bus 46 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7), a K-line bus protocol (ISO 9141 and ISO 14230-1), and/or an Ethernet™ bus protocol IEEE 802.3 (2002 onwards), etc. In some examples, the ECU 26 and sensors 22 are organized on separate data buses to manage, for example, data congestion, data management, etc. For example, the ECU 26 (e.g., the brake control unit 50, the throttle control unit 52, etc.) may be on a separate bus from the other ECU 26 and sensors 22.

Figure 3B:
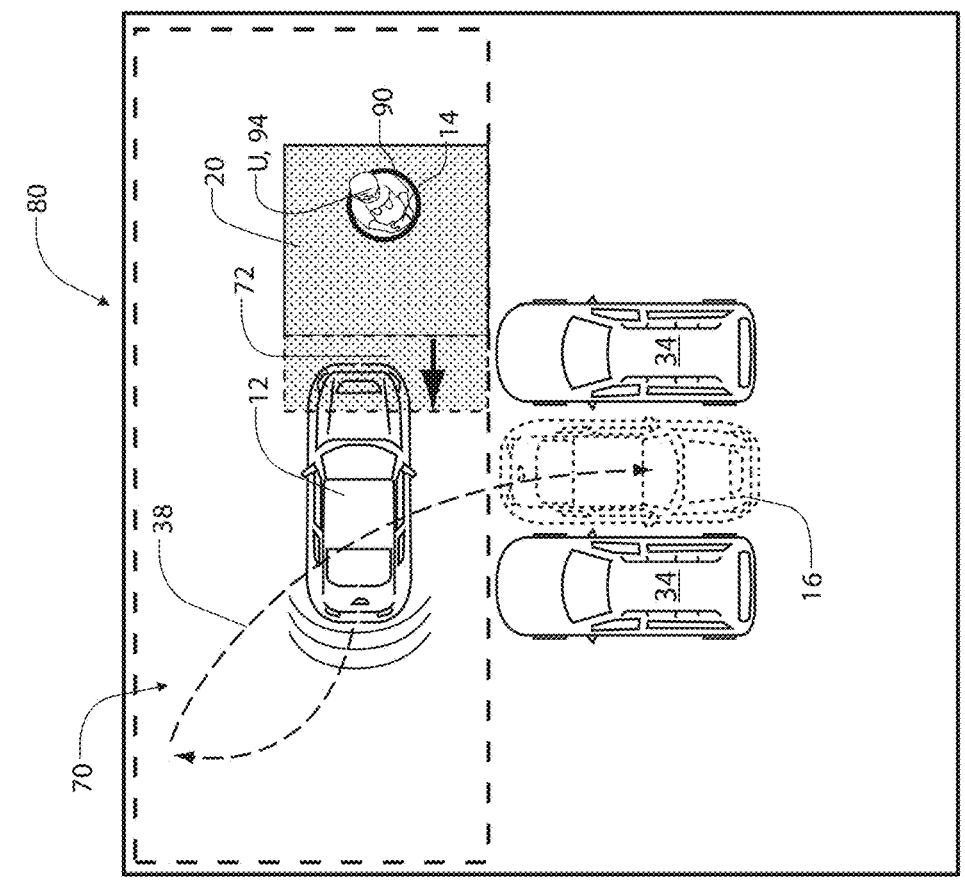
FIG. 3B is a plan view of a vehicle demonstrating an assisted parking routine identifying a user/pedestrian in a viewing zone.
Figure 3A:
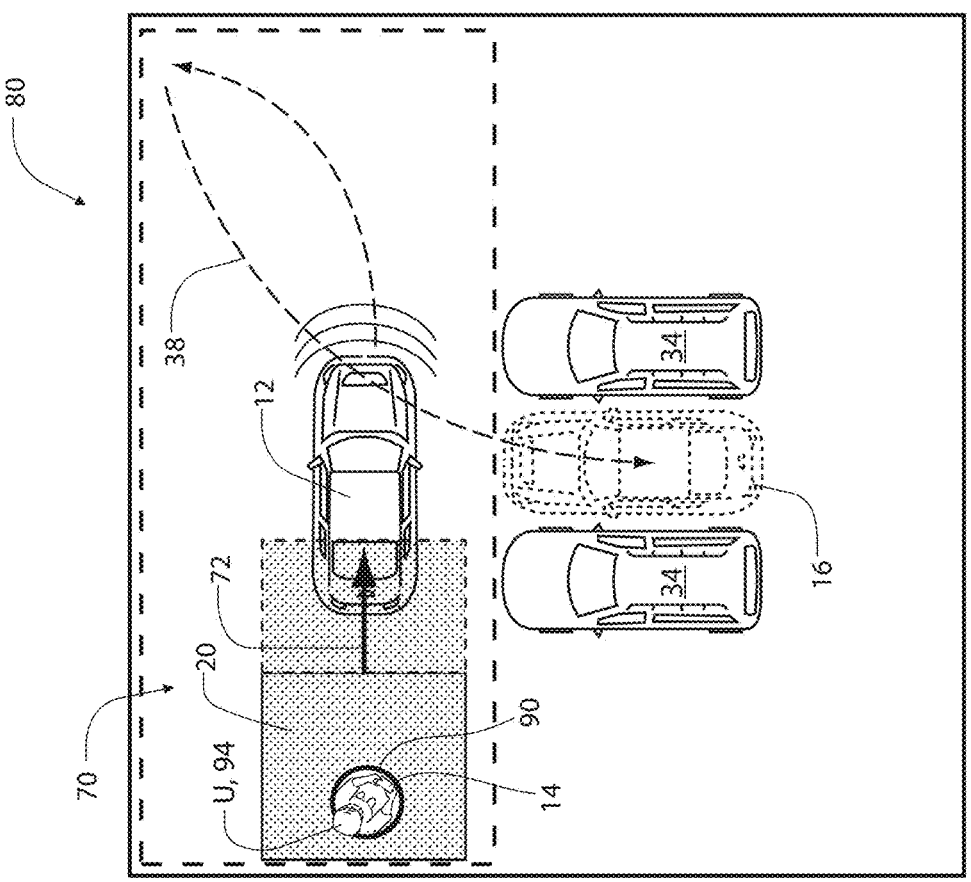
FIG. 3A is a plan view of a vehicle demonstrating an assisted parking routine identifying a user/pedestrian in a viewing zone.

Referring now to FIGS. 3A and 3B, remote parking routines are shown demonstrating the vehicle travel path 38 as well as the designated viewing zone 20 of the user U. FIG. 3A demonstrates a backward parallel parking routine and FIG. 3B demonstrates a forward parallel parking routine. In each case, the system 10 processes sensory data from the sensors 22 identifying the parking space 16. Once detected, the controller 64 may process a path derivation routine to identify the travel path 38 of the vehicle 12 over an unobstructed region 70 in order to guide the vehicle 12 into the parking space 16. Once the travel path 38 is identified, the controller 64 may define or designate the viewing zone 20 for the user U. In some cases, the system 10 may require that the user U is located in the viewing zone 20 in order to allow an initiation of and/or maintain the autonomous or semiautonomous operation of the vehicle along the travel path 38.

As previously discussed, the location of the user may be detected by the system 10 based on the sensor data from the range sensors 22a and image sensors 22b and/or the detected location of the remote device 14. In this way, the system 10 may ensure that the user U is positioned in the viewing zone 20 throughout the control of the vehicle 12 traversing the travel path 38. In various implementations, the proportions of the viewing zones 20 may be fixed or may be adjusted to optimize the view of the vehicle 12, the parking space 16, and/or various objects along the travel path 38. For example, arrows 72 represent the changing boundary of each of the viewing zones 20 based on the position of the vehicle 12 along the travel path 38. In such instances, the user U may be instructed to relocate the remote device 14 within one of the viewing zones 20 in response to the changing proportions of the viewing zones 20. The changing proportion of the viewing zones 20, as represented by the arrows 72, may be the result of a change in the position of the vehicle 12 along the travel path 38 and/or the position of one or more objects (e.g., the parked vehicle 34) detected by the system 10 proximate to the travel path 38. As further discussed in reference to FIGS. 4 and 5, the system 10 is operable to communicate the position of the vehicle 12 along the travel path 38 as well as the position of various objects in a simulated scene 80, which may be displayed on the remote device 14. In this way, the system 10 may communicate the viewing zones 20 and communicate instructions to the user U to maintain the remote device 14 viewing zone 20.

In addition to or alternatively to the display of the simulated scene 80 on the remote device 14, the system 10 may be configured to output various indications instructing the user U to maintain a position within one of the viewing zones 20. For example, the controller 64 may control the indicator devices of the vehicle 12 (e.g., lights, speaker system, etc.) via the ECU 26 to instruct the user U to move away from, further behind, or in a direction relative to a portion of the vehicle 12. For example, the controller 64 may output a control instruction to illuminate taillights of the vehicle 12 with increasing intensity or frequency to identify that the vehicle 12 is approaching the user U. Similarly, the controller 64 may control the turn indicators of the vehicle to instruct the user U to move in a corresponding left or right direction relative to a rear portion of the vehicle 12, such that the user U is positioned within one of the viewing zones 20. Additionally, the controller 64 may output audible instructions to the user U via the speaker system instructing a relative location for the user U to move in relation to the vehicle 12. Accordingly, the system 10 may instruct or guide the user U to maintain a position in one of the viewing zones 20 in a variety of ways.

Figure 4:
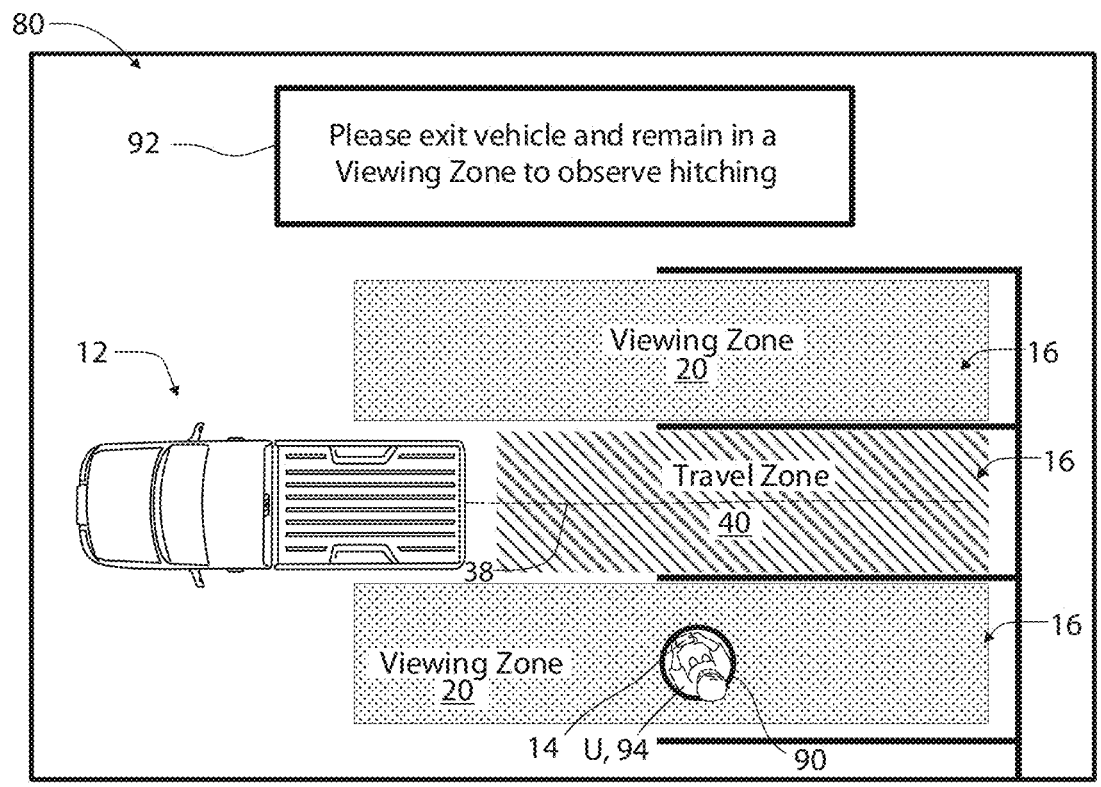
FIG. 4 is a graphical depiction of a simulated scene of a vehicle traversing an assisted parking routine demonstrating a viewing zone.
Figure 5:
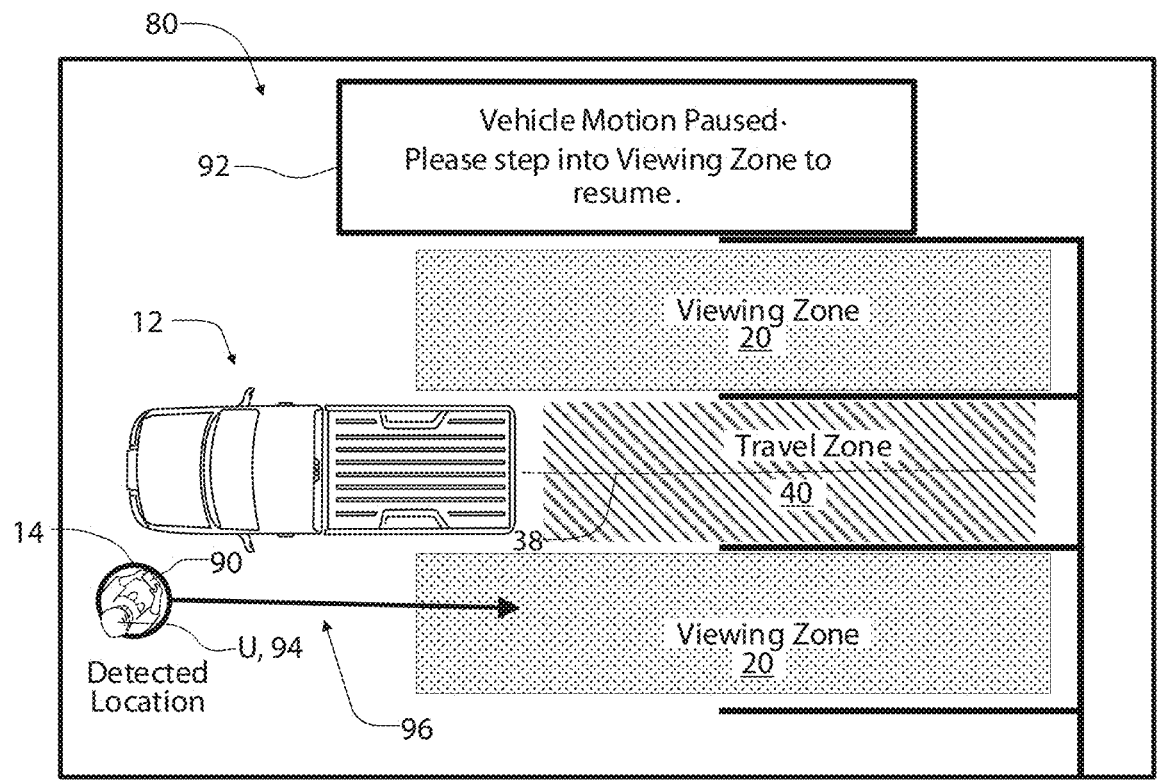
FIG. 5 is a graphical depiction of a simulated scene of a vehicle traversing an assisted parking routine demonstrating a viewing zone.

Referring now to FIGS. 4 and 5, simulated scenes 80 of the vehicle 12 and the parking space 16 are shown demonstrating the viewing zones 20 as well as the travel zone 40. In operation, the simulated scene 80 may be updated based on the movement of the vehicle 12 along the travel path 38 as well as a location 90 of the remote device 14. In this way, the system 10 may provide for the display of the simulated scene 80 on a screen or user interface of the remote device 14. The simulated scene 80 may further include one or more instructions 92, which may guide the user U to move in order to locate the remote device 14 in one of the viewing zones 20. In this way, the system 10 may communicate graphical instructions to coach and instruct the user U to be positioned within and thereby locate the remote device 14 within the viewing zone 20, while implementing the remote park-assist operation.

As depicted in FIG. 4, the simulated scene 80 is shown including the instruction 92 directing the user U to exit the vehicle 12 and position the remote device 14 in one of the viewing zones 20. In operation, the simulated scene 80 depicted on the HMI 66 and/or remote device 14 may demonstrate an estimated position of the vehicle 12 in relation to the parking space 16 and the corresponding travel zone 40 positioned therebetween along the travel path 38. Additionally, a user symbol 94 may be depicted in the simulated scene 80 identifying a relative location of the remote device 14 and a corresponding inferred location of the user U. In this way, the system 10 may provide instructions and feedback to the user U, such that the user U may easily be located in one of the viewing zones 20 and outside the travel zone 40 of the vehicle 12.

Referring now to FIG. 5, the simulated scene 80 demonstrates additional instructions 92 communicated to the user U to assist in the completion of the remote parking routine. As previously discussed, the disclosure may provide for the remote operation of the vehicle 12 controlled and/or observed via the remote device 14 and may track the location of the remote device 14 to enable the motion of the vehicle along the travel path 38. During such an operation, the controller 64 of the system 10 may halt or suppress the motion of the vehicle 12 in response to the remote device 14 and the inferred location of the user U being outside the viewing zones 20. As depicted in FIG. 5, the instruction 92 indicates that the motion of the vehicle 12 is paused and requests the user to step into one of the viewing zones 20 to resume the remote parking routine. The simulated scene 80 includes the user symbol 94 identifying a location of the remote device 14 approximate the vehicle 12 and the parking space 16. Additionally, the simulated scene 80 may include a graphical representation of a positioning instruction 96, which may assist the user U in identifying where to move in order to enter one of the viewing zones 20. Accordingly, the system of may provide for the simulated scene 80 to be displayed on the display of the remote device 14 in accordance with the disclosure.

As previously discussed, the system 10 may identify the location of the remote device 14 by monitoring communication signals to and from the remote device 14 via the communication platform 32. The location of the remote device 14 may, therefore, be detected by the system 10 based on RSS (Received Signal Strength), AOA (Angle of Arrival), TOA (Time of Arrival), and TDOA (Time Difference of Arrival), which may be supported by one or more wireless protocols (e.g., Bluetooth® Low Energy (BLE), Ultra-Wideband, etc.). Additionally, the location of the remote device 14 may be used to infer the location of the user U. Though specific locating techniques are described herein in reference to the detection of the location of the remote device 14, the system 10 may utilize various techniques including ultrasonic proximity detection, mono or stereoscopic imaging, LIDAR (laser imaging, detection, and ranging), etc. Accordingly, the methods and system described herein may be implemented via a variety of sensory technologies without departing from the spirit of the disclosure.

Figure 6:
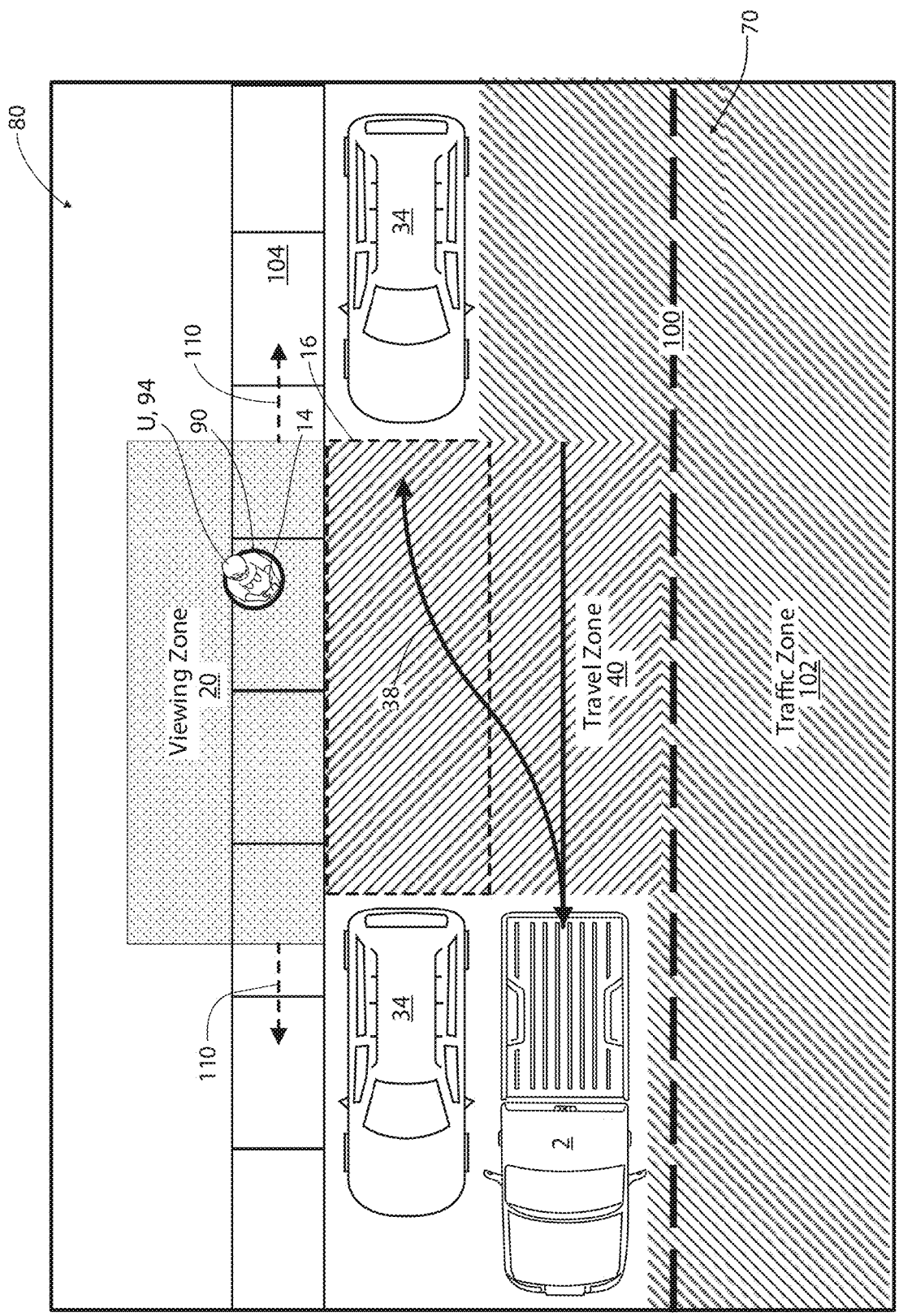
FIG. 6 is a plan view of a vehicle demonstrating an assisted parking routine identifying a user/pedestrian in a viewing zone.

Referring now to FIG. 6, a remote park-assist routine is shown demonstrated on a street 100. As demonstrate, the vehicle 12 is shown traversing the travel path 38 and maneuvering into the parking space 16. In operation, the system 10 processes sensory data from the sensors 22 identifying the parking space 16. Once detected, the controller 64 may process a path derivation routine to identify the travel path 38 of the vehicle 12 over an unobstructed region 70 in order to guide the vehicle 12 into the parking space 16. Once the travel path 38 is identified, the controller 64 may define or designate the viewing zone 20 for the user U. In some cases, the system 10 may require that the user U is located in the viewing zone 20 in order to initiate and/or maintain the autonomous or semiautonomous operation of the vehicle along the travel path 38. In order to define the travel path 38, the travel zone 40, and the viewing zone 20, the system may access geographic or environmental data to ensure that parking space 16 and the viewing zone 20 are both valid for parking the vehicle 12 and viewing the operation, respectively.

In order to define the viewing zone 20, the travel zone 40, and the traffic zone 102, the system 10 may determine the location of the parking space 16 in relation to traffic, structures, walkways, and various other local objects or obstructions that may be encountered by the vehicle 12 and the user U. For example, in response to identifying the parking space 16, the system 10 may connect, via the communication platform 32, to a server on an external network (e.g., the Internet) to determine environmental data, such as the surroundings and local environment surrounding the parking space 16. For example, a navigation data provider (e.g., Google®, MapQuest®, Waze®, etc.) or various geographic information systems may supply data on whether the parking space 16 is located adjacent to the traffic zone 102, a pedestrian walkway 104, additional parking space, structures and various natural and/or manmade obstructions. In this way, the system 10 may identify the viewing zone(s) 20 away from obstructions and the traffic zone 102 in relation to the travel path 38 of the vehicle 12.

Figure 7:
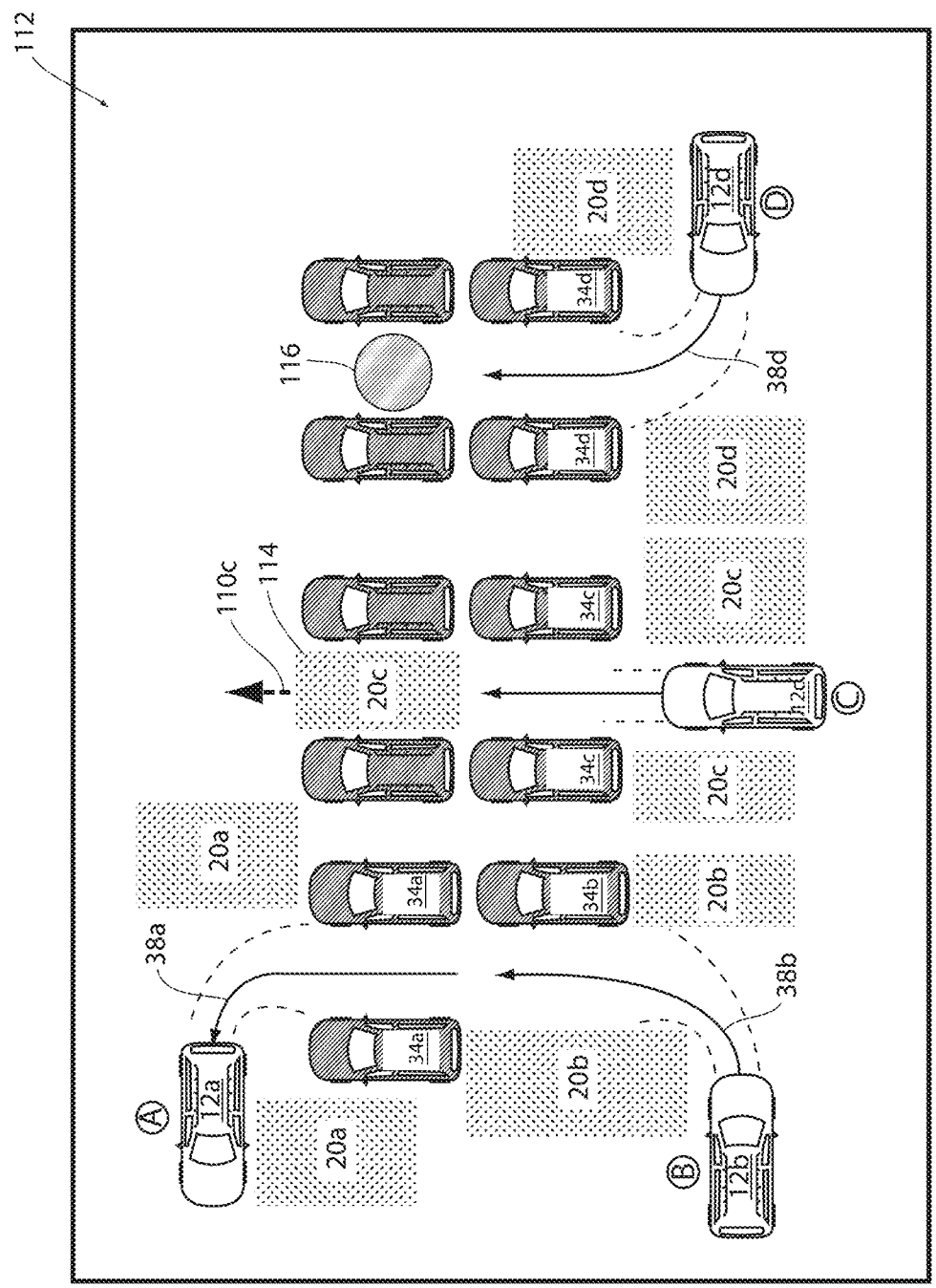
FIG. 7 is a plan view of various parking scenarios for an assisted parking routine demonstrating viewing zones for a pedestrian user.

In some cases, the system 10 may identify an egress path 110 from the viewing zone 20 away from the vehicle 12, traffic, parked vehicles 34 and other obstructions, such that user U has a travel path away from the vehicle 12 once located in the parking space 16. The egress path 110 may be identified with the vehicle 12 located in the parking space 16 or in response to the vehicle 12 located in an intermediate location along the travel path 38. For example, as the system 10 controls the vehicle 12 to traverse the travel path 38, the controller 64 may identify that the egress path 110 is narrowing or becoming inaccessible as a result of a future position of the vehicle 12 along the travel path 38. Accordingly, the system 10 may control the vehicle 12 to pause motion of the vehicle 12 along the travel path 38 and instruct the user U to relocate to an alternate or additional viewing zone 20 (e.g. as depicted in FIG. 7) via the instructions 92 or 96. In this way, the system 10 may provide the user U with instruction to adjust a position from which to view the operation of the vehicle 12 along the travel path 38 to ensure that the user U has access to the egress path 110 before the path 110 is obstructed by the vehicle 12 traversing the travel path 38. The egress path 110 is further discussed in reference to FIG. 7.

In cases where the vehicle 12 is operating in a traffic zone 102, the system 10 may implement the detection sensors 22 to monitor the operating environment of the vehicle 12. That is, the controller 64 may monitor scanning data (image data, proximity data, etc.) communicated from the detection sensors 22 along the travel path 38 to detect approaching vehicles, pedestrians, or other objects. In this way, the system 10 may provide for the detection of various obstructions that may hinder the operation of the remotely operated assisted or autonomous parking operation. Though discussed in reference to specific scenarios, it shall be understood that the operating routines, methods, and operating hardware discussed herein may be implemented in a variety of parking scenarios.

Referring now to FIG. 7, the remote observation of a variety of parking scenarios is discussed in further detail. For clarity, the scenarios are identified as a first routine A, a second routine B, a third routine C, and a fourth routine D. Additionally, each of the corresponding travel paths 38, viewing zones 20, parking spaces 16, etc. include designations identifying the routine to which they correspond. For example, the first routine A includes a travel path 38a, viewing zone 20a, etc. In general each of the scenarios described in reference to FIG. 7 is demonstrated in a parking lot 112. Accordingly, the surfaces depicted may be identified by the controller 64 as pedestrian walkways 104 or limited traffic regions over which the vehicle 12 may operate and the user U may move freely in the parking lot 112. The controller 64 may additionally communicate the instruction 92 via the remote device 14 alerting the user U of potential traffic. Again, the system 10 may identify the nature of the operating environment (e.g. pedestrian, parking, operation, speed restrictions, etc.) by accessing a remote server of a navigation data provider (e.g., Google®, MapQuest®, Waze®, etc.) or various geographic information systems. Note that the travel zones 40 associated with each of the scenarios are not shown for clarity. However, the travel zones 40 follow the travel path 38 and include clearance for the extents of the vehicle 12 traversing the travel path 38.

Referring now to the first routine A, the system 10 may also be operable to control the vehicle 12*a* to exit the parking space 16*a*. This operation of the vehicle 12*a* may be particularly beneficial in cases where the parking space 16*a* is too small to accommodate the width of the vehicle with one of the passenger doors opened. As shown, the viewing zones 20*a* are positioned outside the parking space 16*a* and the adjacent parked vehicles 34*a*. In this way, the system 10 may position the user U in one of the viewing zones 20*a*, such that the user U may view the operation of the vehicle 12*a* along the travel path without impeding the operation of the vehicle 12*a*. Additionally, the position of the viewing zones 20*a* provides for the egress or an exit path for the user U away from the adjacent parked vehicles 34*a* and may further account for various obstructions that may restrict the freedom of motion of the user U. As previously discussed, the objects in the local environment surrounding the vehicle 12*a* may be identified based on the sensory data from the detection sensors 22 as well as the geographic data accessed via the communications platform 32.

The second routine B demonstrates a scenario wherein the viewing zones 20*b* extend significantly along the travel path 38*b* of the vehicle 12*b*. In contrast with the first routine A, the user U may view the assisted parking operation from a position along an entire side (e.g. a driver's side) of the vehicle 12*b*. The second routine B demonstrates that the boundaries of the viewing zones 20*b* may be expanded or retracted based on the location of the parking space 16*b* in relation to the adjacent surroundings (parked vehicles 34*b*, objects, structures, etc.). Accordingly, the system 10 may flexibly define the viewing zones 20 to maximize the flexibility of the viewing position for the user U by expanding the viewing zones 20 in response to the objects detected or identified proximate to the parking spaces 16*a*, 16*b*, etc.

Referring now to the third routine C and the fourth routine D, the examples shown are demonstrated for a comparison of the viewing zone 20*c* and 20*d*. In general, the third routine C and the fourth routine D are similar in operation. That is, the vehicles 12*c* and 12*d* are controlled along their corresponding travel paths 38*c* and 38*d* that the vehicles 12*c* and 12*d* are parked between parked vehicles 34*c* and 34*d* along entry sides of the vehicles 12*c* and 12*d*. However, the third routine C demonstrates the vehicle 12*c* entering the parking space 16*c* with a pull through or egress space 114. In contrast, an obstruction 116 (e.g. a structural column as shown) may block the location of a comparable egress space through which the user U may travel. Accordingly, the system 10 may identify the obstruction 116 and eliminate the corresponding viewing zone 20*d* in response to the obstruction 116 blocking the exit path of the user U following completion of the navigation of the vehicle along the travel path 38*d*. Such operation may be particularly beneficial to the user when completing a remote assisted parking operation in a crowded parking lot to ensure that the vehicle 12*d* does not impede the freedom of movement of the user U.

Figure 8:
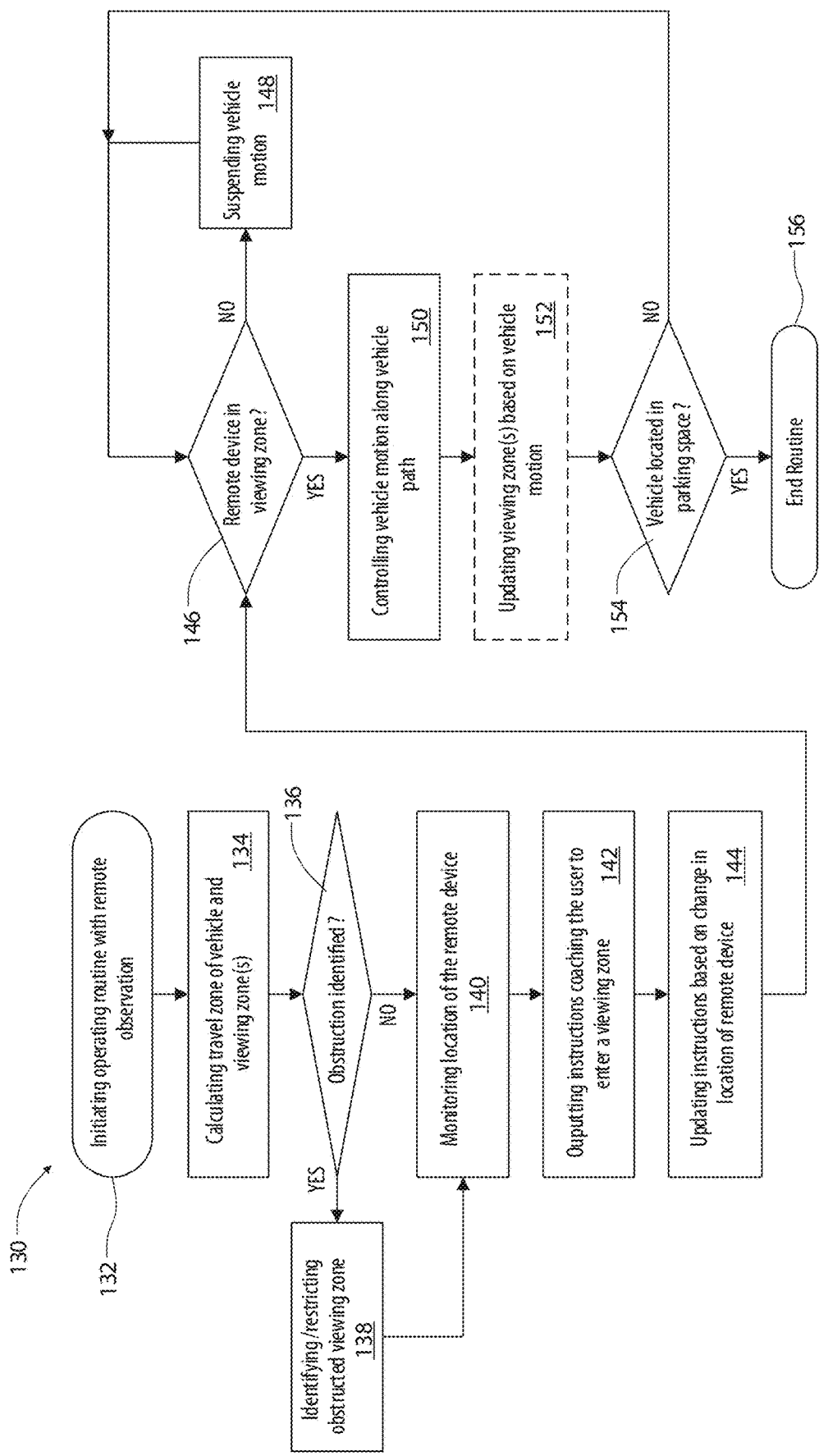
FIG. 8 is a flow chart demonstrating a method for instructing a user/observer to maintain a position within a viewing zone during an automated parking routine in accordance with the disclosure.

Referring now to FIG. 8, a method 130 for coaching the user U to locate the remote device 14 within one of the viewing zones 20 is shown. The method 130 may begin in response to initiating the remote assisted parking routine, allowing the user U to view the navigation of the vehicle 12 from outside the passenger compartment of the vehicle (132). Upon initiation of the remote parking routine, the method 130 may calculate the travel zone 40 of the vehicle 12 based on the travel path 38 and define the viewing zone(s) 20 (134). With the viewing zones 20 calculated, the controller 64 may scan the sensor data from the detection sensors 22 to determine if an obstruction or object is located in one of the viewing zones 20 (136). If an obstruction is identified in step 136, the controller 64 may identify the obstructed viewing zone 20 and restrict or withdraw an instruction to the user, such that the obstructed viewing zone is not available for observation (138). If no obstruction is identified in step 136 or following the restriction of one of the viewing zones in step 138, the method 130 may continue to identify a location of the remote device (140).

With the proportions of the viewing zones 20 and the location of the remote device 14 determined, the controller 64 may output one or more instructions coaching the user U to enter one or either of the viewing zones 20 (142). As discussed herein, the instructions may be provided to the user U via the display of the remote device 14. The instructions may also be output via various indicator devices of the vehicle (e.g., the lights, the speaker system, etc.) as well as similar indicator devices of the remote device 14 or various other vehicle accessories that may be in communication with the system 10. Additionally, in step 144, the controller 64 may update the instructions communicated to the user U based on detected changes in the location of the remote device 14. Accordingly, the method 130 may provide for a flexible solution to instruct the user U to locate the remote device 14 within one of the viewing zones 20.

By continuing to monitor the location of remote device 14, the method 130 may determine if the remote device 14 is located in the viewing zone in step 146. If the remote device 14 is not located in one of the viewing zones 20, a motion control operation of the vehicle 12 may be suspended (148). As previously discussed in reference to step 138, if one of the viewing zones 20 is restricted due to an object or obstruction 116, the detection in step 146 may be limited to one of the viewing zones 20 that is identified as accessible or unobstructed. If the remote device 14 is identified within one of the viewing zones 20 in step 146, the method 130 may continue to control the motion of the vehicle 12 along the travel path 38 (150).

As previously discussed, the system 10 may provide for updated parameters for proportions of the viewing zones 20 based on the position of the vehicle 12 along the travel path 38 as well as the detection of objects proximate to the vehicle 12 (152). Based on the changing proportions of the viewing zones 20, the method 130 may continue to monitor the location of the remote device 14 and provide instructions to the user U to locate the remote device 14 in the viewing zone(s) as previously discussed in steps 140, 142, and 144. Finally, based on the continuing motion of the vehicle 12 along the travel path 38, the system 10 may identify if the vehicle 12 is located aligned with the parking space 16 in step 154. If the vehicle 12 is not located in the parking space 16 in step 154, the method 130 may return to step 146 to verify that the remote device 14 is located in one of the viewing zones 20. If the vehicle 12 is located in the parking space 16 in step 154, the method 130 may end as a result of the automated or semi-automated movement of the vehicle 12 being stopped in response to the alignment of the vehicle with a target position (156).

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A control system for a vehicle comprising:
at least one detection device configured to capture detection data; and
a controller that:
identifies a parking space for the vehicle in an operating area based on the detection data;
identifies a travel path of the vehicle from a current position to a target position aligning the vehicle with the parking space;
in response to the travel path, calculates a travel zone occupied by the vehicle traversing the travel path;
identifies at least one obstruction that has an obstruction boundary and is proximate to or located in either the parking space or the travel zone based on the detection data;
determines at least one viewing zone adjacent to either the travel zone or the parking space and is located such that a line of sight between the viewing zone and the travel path is unobstructed by the at least one obstruction;
determines a location of a user based on the detection data; and
controls a navigation routine of the vehicle along the travel path in response to the location of the user relative to the at least one viewing zone.

2. The control system according to claim 1, wherein the at least one detection device comprises a communication module configured to communicate with a remote device comprising a user interface, wherein the communication module identifies a position of the remote device and infers the location of the user.

3. The control system according to claim 2, wherein the communication module is further configured to communicate with a remote server via a wireless network, and wherein the controller further accesses geographic information for the operating area.

4. The control system according to claim 3, wherein the controller further:
identifies a traffic zone and a pedestrian zone in response to the geographic information for the operating area.

5. The control system according to claim 2, wherein the controller further:
in response to the position of the remote device outside the viewing zone, generates an instruction to relocate the remote device in the viewing zone, wherein the instruction provides at least one of a direction and a distance to relocate the remote device in the viewing zone.

6. The control system according to claim 5, wherein the controller further:
instructs the remote device to demonstrate a simulated scene demonstrating the travel zone of the vehicle, the viewing zone, and the location of the remote device.

7. The control system according to claim 1, wherein the controller further:
in response to the location of the user outside the viewing zone, controls the vehicle to suspend the navigation routine of the vehicle along the travel path.

8. The control system according to claim 1, wherein the at least one detection device comprises at least one of a camera and a proximity detection device.

9. The control system according to claim 1, wherein the controller further:
detects at least one obstruction proximate to the travel path via the detection data and adjusts a boundary of the at least one viewing zone corresponding to the location of the obstruction.

10. The control system according to claim 9, wherein the at least one obstruction comprises a parked vehicle located proximate to the parking space.

11. The control system according to claim 1, wherein the controller further:
determines viewing locations for the at least one viewing zone in response to a traffic zone and a pedestrian zone identified in the operating area.

12. The control system according to claim 1, wherein the controller further:
determines an egress path from the at least one viewing zone to a region away from the parking space; and
adjusts the at least one viewing zone, such that the egress path is unobstructed by the at least one obstruction with the vehicle located in the parking space.

13. The control system according to claim 1, further comprising:
a vehicle maneuvering system that controls a velocity and a steering angle of the vehicle along the travel path in response to instructions received from the controller.

14. A method for enforcing a viewing zone for monitoring a semi-automated vehicle operation of a vehicle, the method comprising:
identifying a parking space for the vehicle in an operating area via detection data;
identifying a travel path of the vehicle from a current position to a target position aligning the vehicle with the parking space, wherein the travel path includes a travel zone of the vehicle extending from the current position to the target position;
in response to the travel path, calculating a travel zone occupied by the vehicle traversing the travel path;
determining a perimeter of at least one viewing zone based on the travel zone, wherein the at least one viewing zone is adjacent to either the travel zone or parking zone;
identifying at least one obstruction in the operating area;
adjusting the perimeter of the at least one viewing zone based on the at least one obstruction; and
controlling a navigation routine of the vehicle along the travel path in response to a location of a user relative to the perimeter of the at least one viewing zone.

15. The method according to claim 14, wherein detecting the location of the user comprises detecting the location based on a position of a remote device identified via a communication module.

16. The method according to claim 15, further comprising:
in response to the position of the remote device outside the viewing zone, generating an instruction to relocate the remote device in the viewing zone.

17. The method according to claim 14, further comprising:
  determining viewing locations for the at least one viewing zone in response to a traffic zone and a pedestrian zone identified in the operating area.

18. The method according to claim 14, further comprising:
  determining an egress path from the at least one viewing zone to a region away from the parking space; and
  adjusting the at least one viewing zone, such that the egress path is unobstructed by the at least one obstruction with the vehicle located in the parking space.

19. A control system for a vehicle comprising:
  at least one detection device configured to capture detection data wherein the at least one detection device is configured to identify a position of a remote device relative to the vehicle; and
  at least one controller that:
    identifies a parking space for the vehicle in an operating area via the detection data;
    identifies a travel path of the vehicle from a current position to a target position aligning the vehicle with the parking space;
    in response to the travel path, calculates a travel zone occupied by the vehicle traversing the travel path;
    identifies a pedestrian zone in response to geographic information for the operating area;
    identifies at least one obstruction proximate to or positioned in at least one of the parking space, the travel zone, or pedestrian zone based on the detection data;
    determines at least one viewing zone adjacent to at least one of either the travel zone or the parking space, wherein the at least one viewing zone is positioned in the pedestrian zone and spaced from the at least one obstruction;
    identifies the position of the remote device and infers a location of a user based on the position of the remote device;
    controls a navigation routine of the vehicle along the travel path in response to the location of the user relative to the at least one viewing zone; and
    suspends the navigation routine when the location of the user is outside the at least one viewing zone.

20. The control system according to claim 1, wherein the controller further:
  detects a change in the obstruction boundary; and
  identifies at least one updated viewing zone based on the change in the obstruction boundary and the at least one viewing zone.

* * * * *